US010255231B1

(12) United States Patent
Briggs et al.

(10) Patent No.: US 10,255,231 B1
(45) Date of Patent: Apr. 9, 2019

(54) APPARATUS AND METHODS FOR MANAGING AGGREGATE INTEGRATED CIRCUIT (IC) CURRENT DEMAND

(71) Applicant: Marvell International Ltd., Hamilton (BM)

(72) Inventors: Randall D. Briggs, Boise, ID (US); Shankar Kozhumam, Austin, TX (US)

(73) Assignee: Marvell International Ltd., Hamilton (BM)

( * ) Notice: Subject to any disclaimer, the term of this patent is extended or adjusted under 35 U.S.C. 154(b) by 26 days.

(21) Appl. No.: 15/210,126

(22) Filed: Jul. 14, 2016

Related U.S. Application Data

(60) Provisional application No. 62/199,443, filed on Jul. 31, 2015.

(51) Int. Cl.
*G06F 1/32* (2006.01)
*G06F 15/78* (2006.01)
*G06F 1/3287* (2019.01)
*G06F 1/3234* (2019.01)
*G06F 1/3203* (2019.01)

(52) U.S. Cl.
CPC ........ *G06F 15/7807* (2013.01); *G06F 1/3243* (2013.01); *G06F 1/3262* (2013.01); *G06F 1/3287* (2013.01); *G06F 1/3203* (2013.01)

(58) Field of Classification Search
CPC .. G06F 1/3262; G06F 1/3287; G06F 15/7807; G06F 1/3243
USPC ......................................................... 713/323
See application file for complete search history.

(56) References Cited

U.S. PATENT DOCUMENTS

| | | | | |
|---|---|---|---|---|
| 6,304,978 B1* | 10/2001 | Horigan | .................... | G06F 1/26 713/322 |
| 6,564,328 B1* | 5/2003 | Grochowski | ......... | G06F 1/3203 712/E9.049 |
| 6,636,976 B1* | 10/2003 | Grochowski | ............. | G06F 1/28 713/320 |
| 2007/0121698 A1* | 5/2007 | Johns | ..................... | G01K 3/005 374/57 |
| 2007/0245161 A1* | 10/2007 | Shaw | .................... | G06F 1/3203 713/300 |
| 2007/0266269 A1* | 11/2007 | Fuchikami | ............ | G06F 1/3203 713/322 |
| 2009/0063875 A1* | 3/2009 | Terazono | ................ | G06F 1/305 713/300 |
| 2009/0322150 A1* | 12/2009 | Cline | ..................... | G06F 1/206 307/35 |

(Continued)

*Primary Examiner* — Jaweed A Abbaszadeh
*Assistant Examiner* — Volvick Derose

(57) ABSTRACT

The present disclosure describes apparatuses and techniques for managing aggregate IC current demand. In some aspects, respective indications of first and second amounts of current consumed by IC components are received from the IC. The first and second amounts of current are combined to determine an aggregate current demand for the components of the IC. This aggregate current demand is then compared to a threshold for an amount of current that can be provided to the components of IC. Responsive to the aggregate current demand exceeding the threshold, an operational characteristic of one of the components is modified to reduce the aggregate current demand of the components of the IC. This can be effective to prevent the IC from drawing more current than can by supplied to the IC.

20 Claims, 6 Drawing Sheets

(56) References Cited

U.S. PATENT DOCUMENTS

| | | | |
|---|---|---|---|
| 2011/0055596 A1* | 3/2011 | Wyatt | G06F 1/206 713/300 |
| 2011/0113199 A1* | 5/2011 | Tang | G06F 12/0862 711/130 |
| 2012/0245794 A1* | 9/2012 | Aragai | H02J 1/14 701/36 |
| 2012/0278644 A1* | 11/2012 | Chen | G06F 1/26 713/340 |
| 2015/0039922 A1* | 2/2015 | Chalhoub | G06F 1/3234 713/323 |
| 2015/0195887 A1* | 7/2015 | Hoss | H05B 33/0863 315/307 |
| 2015/0268678 A1* | 9/2015 | Yu | G05F 1/46 327/540 |
| 2015/0286550 A1* | 10/2015 | Naffziger | G06F 1/3206 702/61 |
| 2015/0333738 A1* | 11/2015 | Clark | H03K 3/0315 327/534 |
| 2015/0370303 A1* | 12/2015 | Krishnaswamy | G06F 1/324 713/322 |
| 2016/0091950 A1* | 3/2016 | Thompson | G06F 1/3206 713/320 |
| 2016/0091954 A1* | 3/2016 | de la Cropte de Chanterac | G06F 1/3234 713/322 |
| 2016/0091960 A1* | 3/2016 | Ismail | G06F 1/3296 713/320 |
| 2016/0233665 A1* | 8/2016 | Kitchener | G05B 19/042 |
| 2016/0378149 A1* | 12/2016 | Kam | G06F 1/206 713/320 |

* cited by examiner

APPARATUS AND METHODS FOR MANAGING AGGREGATE INTEGRATED CIRCUIT (IC) CURRENT DEMAND

RELATED APPLICATIONS

This present disclosure claims priority to U.S. Provisional Patent Application Ser. No. 62/199,443 filed Jul. 31, 2015, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this disclosure and are not admitted to be prior art by inclusion in this section.

Components of computing and electronic devices are often integrated within specialized chips to reduce design complexity and improve device efficiency. For example, a device's application-specific integrated circuit (ASIC) may include core computing blocks, such as a processor, graphics processor unit, video decoder, memory controller, and the like. Various power supplies provide power for the ASIC and other devices by converting external power down to voltages suitable for the ASIC and components thereof.

To accommodate power demands of the ASIC, these power supplies are typically designed or selected based on a worst-case scenario in which each component of the ASIC simultaneously draws maximum current. Because the ASIC includes the device's most power-intensive components, such as processors and decoders, the power supplies associated with the ASIC are often designed to provide high levels of current. To do so, active and passive devices of the power supplies are sized based on the worst-case scenario, which results in ASIC power supplies that are large and expensive.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method is described that receives, from an integrated circuit (IC), respective indications of first and second amounts of current consumed by first and second components of the IC. The first and second amounts of current are combined to determine an aggregate current demand of the first and second components of the IC. The method then compares the aggregate current demand to a threshold for an amount of current that can be provided to the IC, such as a current rating of a power management IC (PMIC). Responsive to the aggregate current demand exceeding the threshold, the method modifies an operational characteristic of the first component or the second component to reduce the aggregate current demand of the first and second components of the IC.

In other aspects, an apparatus is described that comprises a first output through which first current is provided to an IC and a second output through which second current is provided to the IC. The apparatus also includes a first input to receive a first indication of an amount of the first current consumed by the IC, a second input to receive a second indication of an amount of the second current consumed by the IC, and a third output to transmit a control signal to the IC. A current manager of the apparatus is configured to receive, via the first and second inputs, the indications of the amount of the first and second current consumed by the IC. The current manager then combines the amounts current consumed by the IC to determine aggregate current demand of the IC and compares the aggregate current demand of the IC to a threshold based on an amount of current that the apparatus can provide. Responsive to the aggregate current demand exceeding the threshold, the current manager asserts the control signal to alter operation of the IC effective to reduce the aggregate current demand of the IC.

In yet other aspects, a System-on-Chip (SoC) is described that includes a first pair of switching metal-oxide-semiconductor field-effect transistors (MOSFETs) configured to provide first current to an IC. The SoC also comprises a second pair of switching MOSFETs configured to provide second current to the IC. Input/output logic of the SoC is configured to receive respective indications of an amount of the first current and an amount of the second current consumed by the IC. The SoC includes a microprocessor for executing instructions and a memory storing processor-executable instructions that, responsive to execution by the processor, implement a current manager of the SoC. The current manager implements operations that comprise receiving the respective indications of the amount of the first current and the amount of the second current consumed by the IC. The current manager then combines the amount of the first current and the amount of the second current consumed by the IC to determine aggregate current demand of the IC, which is compared to a threshold based on an amount of current that the System-on-Chip can provide. Responsive to the aggregate current demand exceeding the threshold, the current manager transmits, to the IC, a signal to alter operation of the IC effective to reduce the aggregate current demand of the IC.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of managing aggregate IC current demand are set forth in the accompanying figures and the detailed description below. In the figures, the left-most digit of a reference number identifies the figure in which the reference number first appears. The use of the same reference numbers in different instances in the description and the figures indicate like elements.

DETAILED DESCRIPTION

Conventional techniques for integrating an application specific integrated circuit (ASIC) into a computing system include sizing or selecting a power management IC (PMIC) that will provide power to the ASIC. Typically, this integration task requires determining peak current demand of the major blocks or components of the ASIC, such as processors, graphics processors, video encoders, and the like. This aggregate current demand, along with current demand of other portions of the ASIC, is used to determine the worst-case current demand for which the PMIC must supply current. The worst-case current demand is then used to design or select a PMIC, a current supply capability of which corresponds with a size and cost of the PMIC.

In most usage scenarios, however, the ASIC does not operate at the worst-case current demand. For example, a processor and graphics processor of the ASIC may occasionally operate at their respective peak current draw, but rarely operate concurrently at peak current draw to cause the worst-case current demand. As such, a PMIC designed or selected to power the ASIC based on the worst-case current demand is often over-sized for most real-world ASIC usage scenarios. Because size and current supply capability of the PMIC corresponds to cost, the over-sized PMIC is also expensive and drives an increase in overall system cost.

This disclosure describes apparatuses and techniques for managing aggregate ASIC current demand. In some aspects, a PMIC receives from an ASIC, respective indications of first and second amounts of current consumed by a processor and graphics processor of the ASIC. The first and second amounts of current are combined to determine an aggregate current demand of the processor and graphics processor of the ASIC. The aggregate current demand is then compared to a threshold for an amount of current that the PMIC can be provide to the processor and graphics processor. Responsive to the aggregate current demand exceeding the threshold, the PMIC alters an operational characteristic (e.g., frequency) of the processor or graphics processor to reduce the aggregate current demand of the ASIC. By so doing, the processor, graphics processors, or other components of the ASIC can be prevented from concurrently drawing their respective peak current, thereby avoiding the worst-case current demand of the ASIC. This enables selection of a smaller and less expensive PMIC, which reduces overall system costs.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment

Figure 1:
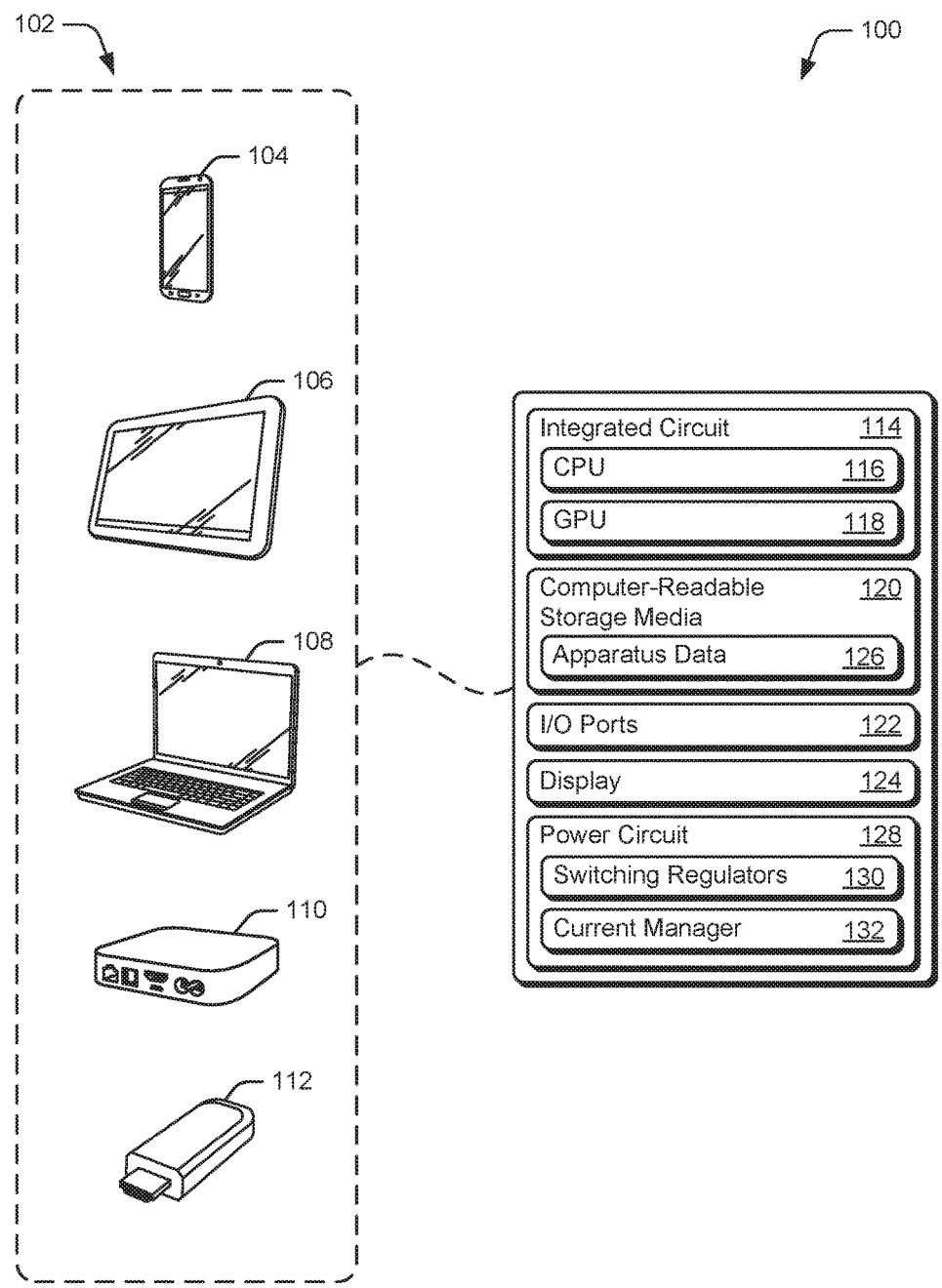
FIG. 1 illustrates an operating environment having example apparatuses and example power circuits.

FIG. 1 illustrates an example operating environment 100 that includes an example apparatus 102, which is capable of operating by drawing power from a battery or an external source. Examples of the apparatus 102 include a smart phone 104, a tablet computer 106, a netbook computer 108, a set-top box 110, and a multimedia dongle 112. Further examples of the apparatus 102 include a desktop computer, a camera, a data storage appliance (e.g., network-attached storage), a personal media device, a navigation device, a portable gaming device, and so on. The apparatus 102 may draw the operating power for any suitable purpose, such as to enable functionalities of a particular type of apparatus, provide a user interface, enable network access, implement gaming applications, capture images, play media, edit content, and the like.

The apparatus 102 includes an example integrated circuit 114, which comprises a central processing unit 116 (CPU 116) and graphics processing unit 118 (GPU 118). The integrated circuit 114 can by implemented as any suitable type of circuit and packaging, such as an application specific IC (ASIC), an application specific standard part (ASSP), or a system-on-chip (SoC). The CPU 116 may be implemented as any suitable type of processor, either single-core or multi-core, for executing code, instructions, or commands of an operating system or application of the apparatus 102. The GPU 118 is configured to render graphical data or image data for display by the apparatus 102 or display connected thereto.

The apparatus 102 may also include computer-readable storage media 120, input/output ports 122 (I/O ports 122), and display 124. The computer-readable storage media 120 (CRM 120) may include volatile memory or non-volatile memory to store apparatus data 126 (e.g., data or instructions for the CPU 116 or GPU 118). Alternately or additionally, the CRM 120 may be implemented using any suitable type of data storage media, such as magnetic media, electronic media, or optical media. In the context of this disclosure, the CRM 120 is implemented as storage media, and thus does not include transitory signals or carrier waves.

The I/O ports 122 of the apparatus 102 are configured to enable interaction with other devices, memory media, data networks, and/or users. The I/O ports 122 may support a variety of connections, such as a universal serial bus (USB), peripheral component interconnect express (PCIe) port, serial advanced technology attachment (SATA) port, wired or wireless network ports, secure digital I/O (SDIO) port, parallel port, audio ports, or infrared port. In some cases, the I/O ports 122 enable communication with other components of the apparatus 102, which may include memory cards or network adapters (not shown).

The display 124 presents graphics of the apparatus 102, which may include user interface elements of an operating system, applications, or system utilities. In some cases, the display 124 is coupled with a touch screen configured to receive user input. In other cases, user input may be received via a hardware interface (e.g., buttons) of the apparatus 102 or through a wired or wireless human-input device. Alternately, such as in the case of the set-top box 110 and multimedia dongle 112, the apparatus may include a display port by which graphic content of the apparatus 102 is transmitted to an external display.

The apparatus 102 includes a power circuit 128 that provides power to support operations of the apparatus's components, such as CPU 116, GPU 118, I/O ports 122, and display 124. Although not shown, the apparatus 102 includes a battery or external power source, the power from which is stepped down by the power circuit 128 to provide operational power for the apparatus 102. Alternately or additionally, the components of the apparatus 102 may operate from the external power source while the battery is charged.

The power circuit 128 includes switching regulators 130 and current manager 132. The switching regulators 130 step power from a battery or external source down to voltages that are suitable for use by the components of the apparatus 102. Although not shown, the power circuit 128 may also include a charging circuit capable of charging a battery from the external power source. The switching regulators 130 may include any suitable number of regulators configured to provide power at various voltages, such as 0.9 volts, 1.1 volts, 1.8 volts, 3.3 volts, 5.0 volts, and so on.

In some aspects, the current manager 132 manages an aggregate amount of current consumed by the CPU 116 and GPU 118 of the IC 114. For example, the current manager 132 may receive respective indications of amounts of current consumed by the CPU 116 and GPU 118. The current manager 132 may then combine the amounts of current to determine an aggregate amount of current consumed by the CPU 116 and GPU 118. This aggregate amount of current is then compared by the current manager 132 to a threshold that corresponds to an amount of current that the power circuit 128 can provide to the integrated circuit 114, CPU 116, and/or GPU 118. When the aggregate amount of current exceeds the threshold, the current manager 132 can alter an operational characteristic of the CPU 116 or the GPU 118 to reduce the aggregate current demand of the CPU 116 and GPU 118. This is but one example implementation of the current manager 132, others of which are described throughout this disclosure.

Figure 2:
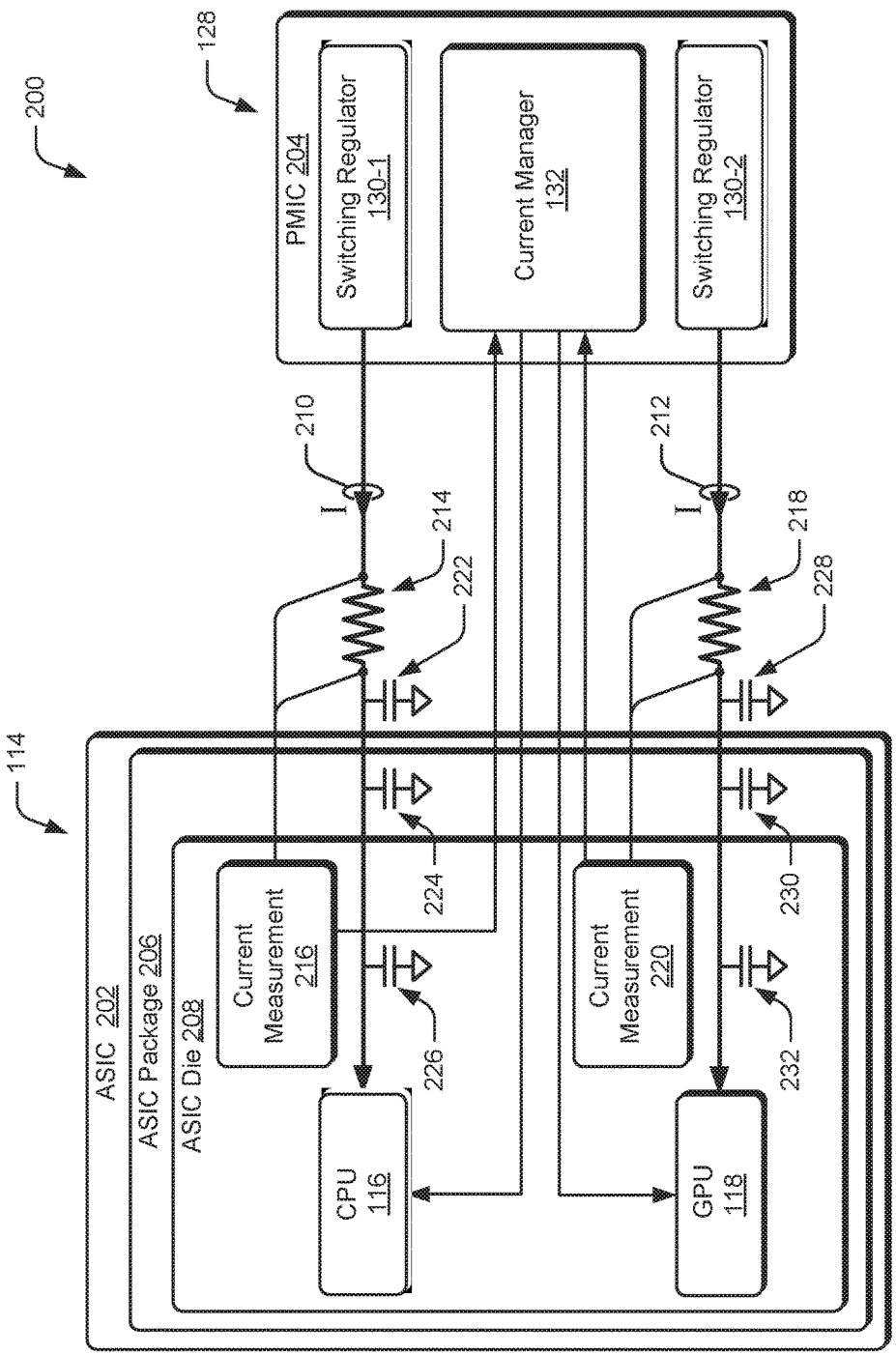
FIG. 2 illustrates example implementations of an IC and power circuit in accordance with one or more aspects.

FIG. 2 illustrates example implementations of an integrated circuit 114 and power circuit 128 generally at 200. In this particular example, the integrated circuit 114 is implemented as an application specific integrated circuit 202 (ASIC 202) and the power circuit 128 is implemented as a power management integrated circuit 204 (PMIC 204). The example ASIC 202 includes an ASIC package 206 and an ASIC die 208, which is physically supported by the ASIC package 206. Components and circuitry of the ASIC 202 can be embodied on the ASIC die 208, and include instances of a CPU 116 and GPU 118, which may be configured similar to or differently than other processors described herein. Although not shown, other components (or blocks) of the ASIC 202 may include video encoders, video decoders, memory controllers, I/O controllers, security and cryptography engines, and the like. Aspects described herein with reference to a processor or graphics processor may also be implemented in association with any other component of the ASIC 202 or apparatus 102.

The components of the ASIC 202 operate using power provided by the PMIC 204. In some cases, the PMIC 204 provides this operational power at particular voltage levels and in amounts of current that vary as respective workloads of the components change over time. In this example, the CPU 116 of the ASIC 202 receives current 210 from a switching regulator 130-1 of the PMIC 204. Additionally, the GPU 118 of the ASIC 202 receives current 212 from another switching regulator 130-2 of the PMIC 204. Other sections or blocks of the ASIC 202 may also receive power from the switching supply 130-1, switching supply 130-2, or other regulators of the PMIC 204 via additional power rails or connections (not shown).

Although implemented as two switching regulators 130-1 and 130-2 (e.g., buck regulators) in this example, the PMIC 204 may provide power to the ASIC 202 using any suitable type of power supply, such as a current pump, boost regulator, linear regulator, or low-dropout regulator (LDO). For example, the PMIC 204 may include two switching supplies and an LDO that are each configured to provide current to a particular block of the ASIC 202 at a different respective voltage. Alternately or additionally, the PMIC 204 may vary a voltage at which power is provided to a component of the ASIC 202. In some cases, scaling the voltage based on a frequency of component operation enables energy savings by reducing voltage overhead at lower the frequencies.

The current 210 and 212 is provided to the CPU 116 and GPU 118 via respective conductors (e.g., power rails or traces) that connect power outputs of the PMIC 204 to power inputs of the ASIC 202. The current 210 also passes through a precision resistor 214 that is connected in series with the conductors that carry the current 210 to the ASIC 202. This precision resistor is a low resistance resistor (e.g., ~10 milliohms) that creates, in response to passing current, a small voltage drop across its terminals. This small voltage drop may not affect functionality or performance of an ASIC or SoC, and may be automatically compensated for by the PMIC 204. A current measurement block 216 of the ASIC die 208 measures a voltage drop across the precision resistor 214 to determine an amount of current that is being consumed by the CPU 116. The current measurement block 216 can transmit, via an output of the ASIC 202, an indication of the amount of current consumed by the CPU 116 to the current manager 132 via an input of the PMIC 204.

The current 212 for the GPU 118 passes through a precision resistor 218 (e.g., a low resistance resistor) that is connected in series with the conductors that carry the current 212 to the ASIC 202. Another current measurement block 220 of the ASIC die 208 measures a voltage drop across another precision resistor 218 to determine an amount of current that is being consumed by the GPU 118. The current measurement block 220 can also transmit, via another output of the ASIC 202, an indication of the amount of current consumed by the GPU 118 to the current manager 132 via another input of the PMIC 204.

In some aspects, an external bypass capacitor 222 connected to the CPU's power rail and a bypass capacitor 224 of the ASIC package 206 filter noise from the power provided to the CPU 116. The ASIC die 208 may also include an intrinsic capacitance 226 associated with parasitic capacitance of the die's circuitry. The external bypass capacitor 222 may be much larger than the bypass capacitor 224 of the ASIC package 206, which in turn can be much larger than the intrinsic capacitance 226. These capacitors and/or capacitance may store energy and provide current in additional to current 210, such as when current demand of the CPU 116 increases due to increased workload. In some cases, this momentarily provides the additional operating current required, providing time for the current measurement block 216 to detect the additional current demand. The current manager 132 may then receive an indication of the additional current demand and respond by altering an operating condition of the CPU 116 before the charge in these capacitors is exhausted.

Alternately or additionally, another external bypass capacitor 228 connected to the GPU's power rail and another bypass capacitor 230 of the ASIC package 206 filter noise from the power provided to the GPU 118. The ASIC die 208 may also include additional intrinsic capacitance 232 associated with the parasitic capacitance of the die's circuitry. The external bypass capacitor 228 may be much larger than the bypass capacitor 230 of the ASIC package 206, which in turn can be much larger than the intrinsic capacitance 232. These capacitors and/or capacitance may store energy and provide current in additional to current 212, such as when current demand of the GPU 118 increases due to increased workload. In some cases, this momentarily provides the additional operating current required, providing time for the current measurement block 220 to detect the additional current demand. The current manager 132 may then receive an indication of the additional current demand and respond by altering an operating condition of the GPU 118 before the charge in these capacitors is exhausted.

In this example, the current manager 132 also includes signal outputs connected to the CPU 116 and GPU 118. These signal lines are connected to respective inputs of the CPU 116 and GPU 118, and enable the current manager 132 to alter or affect respective operations of the CPU 116 or the GPU 118. Although shown as one signal line, the current manager 132 may transmit each signal or command using any suitable type or number of lines. For example, the current manager 132 can set a voltage level of an analog signal to control a frequency at which the CPU 116 operates. Alternately, multiple digital lines can enable the current manager 132 to select from an array of predefined operating frequencies of the GPU 118.

The following discussion describes techniques for managing aggregate IC current demand. These techniques can be implemented using any of the environments and entities described herein, such as the current manager 132 and various components associated therewith. These techniques include methods illustrated in FIGS. 3, 4, and 5, each of which is shown as a set of operations performed by one or more entities. These methods are not necessarily limited to the orders of operations shown. Rather, the operations may be repeated, skipped, or re-ordered to implement various aspects described herein. Further, these methods may be used in conjunction with one another, in whole or in part, whether performed by the same entity, separate entities, or any combination thereof. In portions of the following discussion, reference will be made to operating environment 100 of FIG. 1 and entities of FIG. 2 by way of example. Such reference is not to be taken as limited to operating environment 100 but rather as illustrative of one of a variety of examples.

Figure 3:
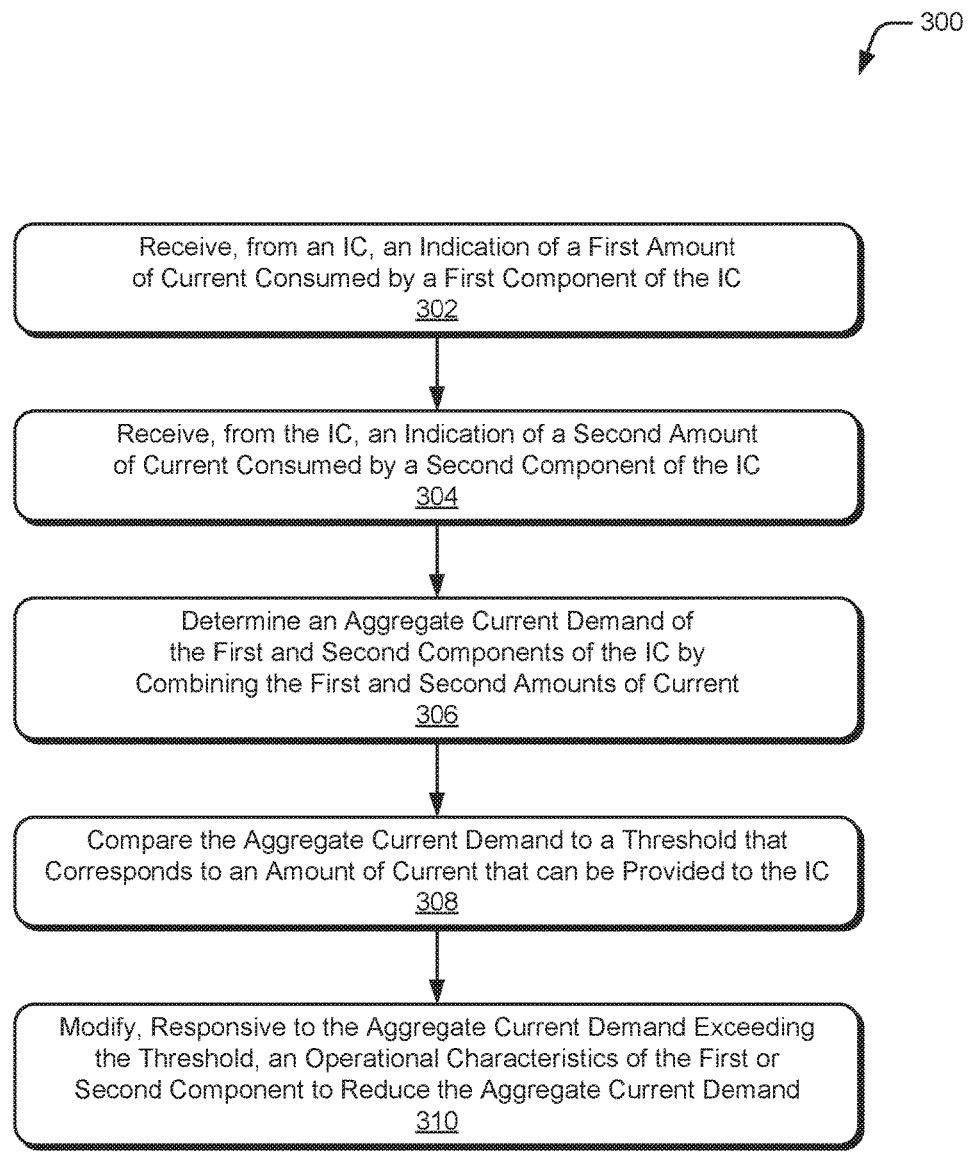
FIG. 3 illustrates an example method for managing aggregate IC current demand in accordance with one or more aspects.

FIG. 3 depicts an example method 300 for managing aggregate IC current demand, including operations performed by the current manager 132.

At 302, an indication of a first amount of current consumed by a first component of an IC is received. The indication may be received by a power circuit providing power to the IC, such as a PMIC. The IC can be configured as any suitable type of IC, such as an ASIC, ASSP, SoC, and the like. In some cases, the first component of the IC is a processor, processor core, or CPU of the IC. The indication of the first amount of current may be communicated via a digital or analog signal, such as an analog signal that has a voltage level corresponding to the first amount of current.

By way of example, consider the ASIC 202 and PMIC 204 of FIG. 2. Here, assume that the ASIC 202, PMIC 204, and other components of the apparatus 102 are embodied as a smart phone on which a user is playing video games. To execute an OS and a video game application, the CPU 116 operates by consuming current 210 provided by the switching regulator 130-1 of the PMIC 204. The current measurement block 216 of the ASIC 202 measures an amount of the current 210 consumed by the CPU 116 and transmits an analog signal representing the amount of current 210 consumed. The current manager 132 of the PMIC 204 then receives the analog signal representing the amount of the current 210 consumed.

At 304, an indication of a second amount of current consumed by a second component of the IC is received. In some cases, the second component of the IC is a graphics processor, graphics processor core, or GPU of the IC. The indication of the second amount of current may be communicated via a digital or analog signal, such as serial data bits or multiple digital lines that indicate a binary value corresponding to the second amount of current.

In the context of the current example, the GPU 118 renders graphical content of the video game by consuming current 212 provided by the switching regulator 130-2 of the PMIC 204. The current measurement block 220 of the ASIC 202 measures an amount of the current 212 consumed by the GPU 118 and transmits another analog signal representing the amount of current 212 consumed. The current manager 132 of the PMIC 204 then receives the other analog signal representing the amount of the current 212 consumed.

At 306, an aggregate current demand of the first and second components is determined by combining the first and second amounts of current. In some cases, a processor or microcontroller of a PMIC converts the respective indications of the current to digital values and adds the digital values together to determine the aggregate current demand. In other cases, analog indications of the current are combined or summed to provide an analog value that represents the aggregate current consumed by the first and second components. Further, the reception or combining of current indications can be scaled for any suitable number of ASIC components. For example, a PMIC may receive and combine dedicated amounts of current for three or four processing cores of an ASIC to determine an aggregate amount of current consumed by those components.

Continuing the ongoing example, the current manager 132 of the PMIC 204 converts the respective analog indications of current consumed by the CPU 116 and GPU 118 into digital values. The current manager 132 then adds these digital values together to provide a digital value that represents the aggregate current demand of the CPU 116 and GPU 118 of the ASIC 202. Here, assume that the video game running on the smart phone maximizes use of the CPU 116 and GPU 118 to 100% and the aggregate current demand of the CPU 116 and GPU 118 is 2.7 amps of current.

At 308, the aggregate current demand is compared to a threshold that corresponds to an amount of current that be provided to the IC. In some cases, the threshold is a predefined threshold for an amount of current that can be provided to the first and second components of the IC. For example, the threshold may be defined for an amount of current that can be provided to a processor and graphics process of the IC, which often consume most of the current provided by a PMIC.

In the context of the present example, the current manager 132 of the PMIC 204 compares the aggregate current demand of the CPU 116 and GPU 118 to a threshold for an amount of current that switching regulator 130-1 and switching regulator 130-2 can provide to the ASIC 202. Here, assume the PMIC's threshold is 2.2 amps, and the current manager 132 determines that the aggregate amount of current consumed by the CPU 116 and GPU 118 exceeds this threshold by 0.5 amps.

At 310, an operational characteristic of the first or second component is modified responsive to the aggregate current demand exceeding the threshold. Modifying the operational characteristic may include reducing a frequency or voltage at which the component operates. In some cases, performance of the component is throttled, such as by scaling a frequency and voltage at which the component operates. In other cases, one or more cores of a multi-core processor are idled or powered-down to reduce a current draw of the processor. By modifying the operational characteristic of the component, the aggregate current demand is reduced, which prevents the IC from drawing more current than can be provided to the IC.

Concluding the present example, the power manager 132 of the PMIC 204 asserts a signal to the GPU 118 that causes the GPU 118 to operate at a reduced frequency. Here, assume that external bypass capacitor 228 and bypass capacitor 230 have a combined capacitance of five microfarads (e.g., five instances of one microfarad), which enables the capacitors to provide a total of 0.5 amps of current for 1 microsecond and prevents the voltage at the GPU 118 from dropping more than 100 millivolts. Given this time and by throttling the GPU 118 to reduce current demand, the current manager 132 enables the PMIC 204 to provide current sufficient to meet temporary spikes in the ASIC's current demand without having to select or design the PMIC 204 to meet around these worst-case scenarios of current demand.

Figure 4:
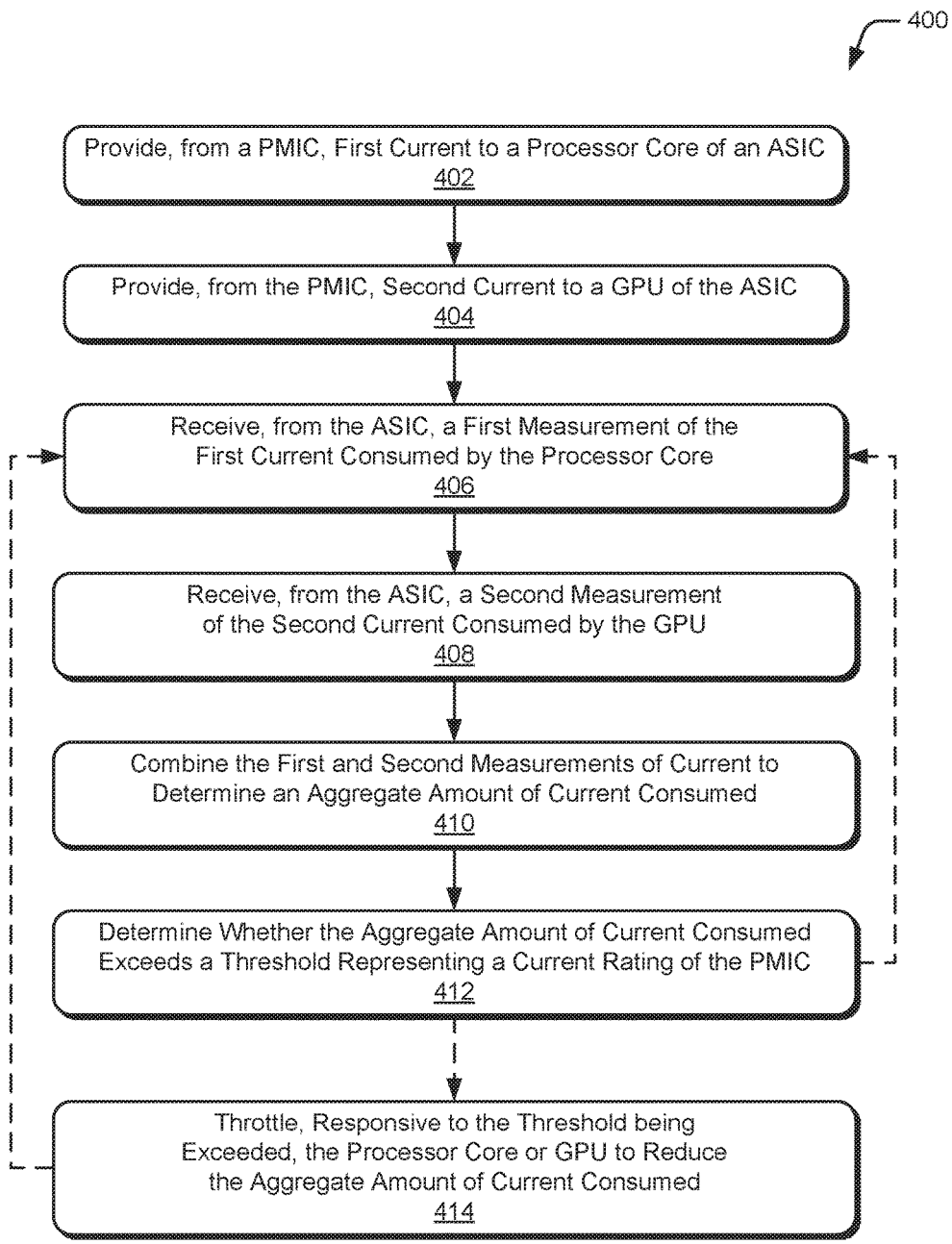
FIG. 4 illustrates an example method for throttling components of an ASIC in accordance with one or more aspects.

FIG. 4 depicts an example method 400 for throttling components of an ASIC, including operations performed by the current manager 132.

At 402, first current is provided by a PMIC to a processor core of an ASIC. The first current may be provided by a switching regulator of the PMIC via a dedicated power rail to the processor core or a processor with which the processor core is associated. In some cases, the ASIC includes a multi-core processor supplied by a power rail through which the cores of the processor draw operating current.

At 404, second current is provided by the PMIC to a GPU of the ASIC. The second current may be provided by the switching regulator or another switching regulator of the PMIC via another dedicated power rail to the GPU. In some cases, the second current is provided to a particular processing core of the GPU of the ASIC.

At 406, a first measurement of the first current consumed by the processor core is received from the ASIC. The first measurement may be received in any suitable format, such as an analog signal, serial data bits, parallel digital lines, and the like. In some cases, the first measurement is received periodically, which enables real-time tracking of the amount of the first current that is consumed by the processor core of the ASIC.

At 408, a second measurement of the second current consumed by the GPU is received from the GPU. The second measurement may be received in any suitable format, such as an analog signal, serial data bits, parallel digital lines, and the like. Alternately or additionally, the first and second measurements may be multiplexed together, received via a common bus, and de-multiplexed after reception. In some cases, the second measurement is received periodically, which enables real-time tracking of the amount of the second current that is consumed by the GPU of the ASIC.

At 410, the first and second measurements of the current are combined to determine an aggregate amount of current consumed by the processor core and GPU. In some cases, a processor or microcontroller of a PMIC converts the respective measurements of the current to digital values and adds the digital values together to determine the aggregate amount of current. In other cases, analog measurements of the current are combined or summed to provide an analog value that represents the aggregate current consumed by the processor core and GPU of the ASIC.

At 412, it is determined whether the aggregate amount of current consumed exceeds a threshold representing a current rating of the PMIC. In some cases, the aggregate amount of current is compared to multiple thresholds that correspond to multiple degrees by which the current rating of the PMIC is exceeded. For example, multiple thresholds may correspond to a current demand that exceeds a rating of the PMIC by 5%, 10%, 15%, 20% or 25%. In such cases, it may be determined which particular threshold is exceeded by the current being consumed by the processor core and GPU of the ASIC.

From 414, the method 400 may return to 406 in response to determining that the aggregate amount of current does not exceed the threshold representing the current rating of the PMIC. Alternately, the method 400 proceeds to 414 in response to determining that the aggregate amount of current does exceed the threshold representing the current rating of the PMIC.

At 414, the processor core or GPU is throttled responsive to the aggregate amount of current exceeding the threshold. Throttling the processor core or GPU may include reducing an operating frequency or operating voltage of the processor core or GPU. In some cases, a degree by which the processor core or GPU is throttled is based on which threshold the aggregate amount of current exceeds. For example, if the aggregate amount of current exceeds the current rating of the PMIC by 5%, a frequency of the processor core may be reduced by 10%. In other cases, if the aggregate amount of current exceeds the current rating of the PMIC by 25%, a frequency of the processor core may be reduced by 50%. The processor core or GPU may be throttled by transmitting an analog signal having a voltage level corresponding to the degree by which the processor core or GPU is to be throttled. From 414 the method 400 may return to 406 to verify whether throttling the processor core or GPU is sufficient to reduce the aggregate amount of current below the threshold.

Figure 5:
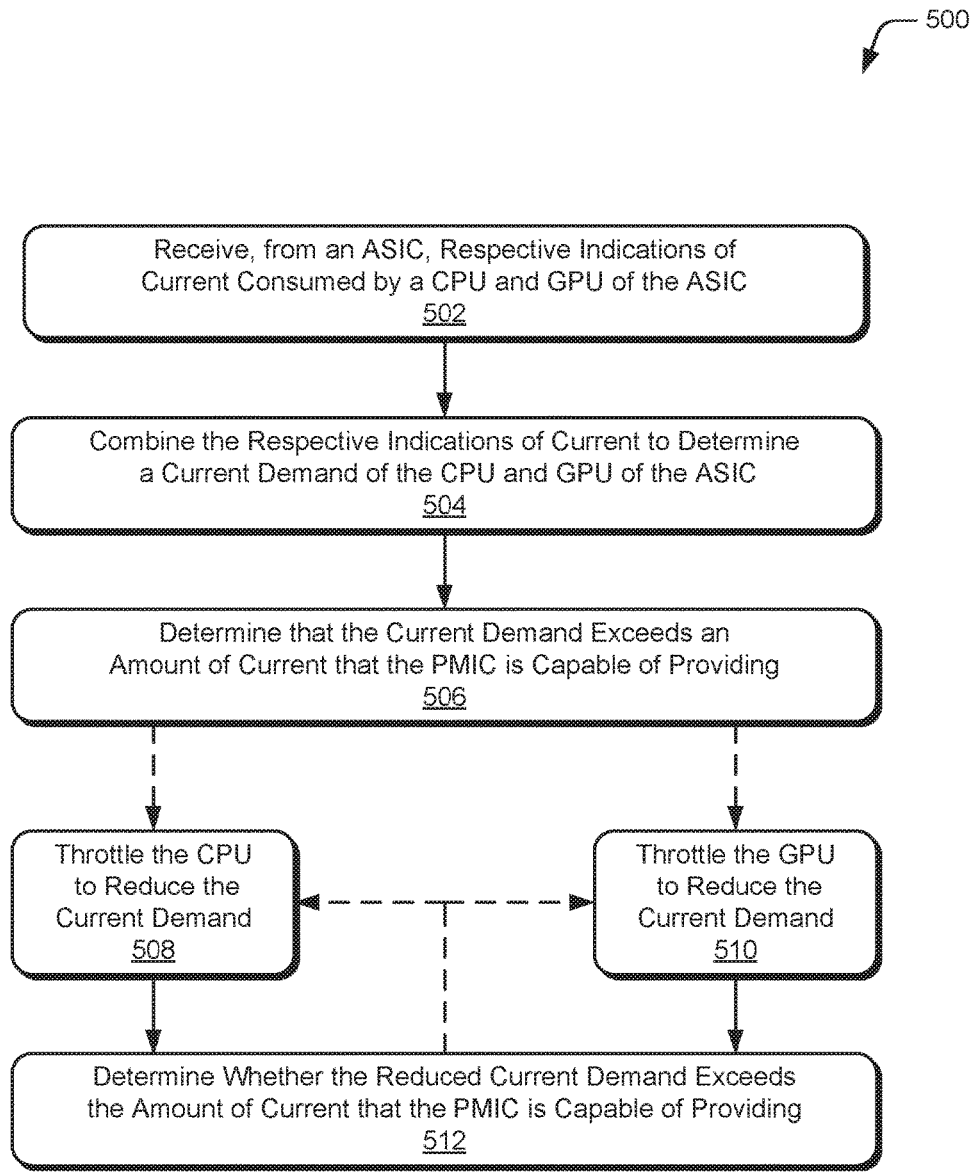
FIG. 5 illustrates an example method for throttling a central processing unit (CPU) or graphics processing unit (GPU) of an ASIC in accordance with one or more aspects.

FIG. 5 depicts an example method 500 for throttling a CPU and/or GPU of an ASIC, including operations performed by the current manager 132.

At 502, respective indications of current consumed by a CPU and GPU of an ASIC are received. The respective indications of the current may be received by a PMIC as analog or digital signals that are transmitted from current measurement blocks of the ASIC. In some cases, the respective indications are received periodically, such as at a frequency of approximately 400 KHz to 10 MHz.

At 504, the respective indications of current are combined to determine a current demand of the CPU and GPU of the ASIC. The respective indications of the current may be converted to digital values and added together to determine the current demand of the CPU and GPU of the ASIC. Alternately or additionally, analog signals of the respective indications may be combined to provide an analog representation of the current demand of the CPU and GPU of the ASIC.

At 506, it is determined that the current demand exceeds an amount of current that the PMIC is capable of providing. In some cases, the current demand is compared to a threshold that corresponds with an amount of current that the PMIC is configured to provide to the CPU and GPU of the ASIC. Alternately or additionally, the current demand of the CPU and GPU may be combined with the PMIC's internal measurement of current provided to other sections of the ASIC and compared with a current rating of the PMIC (e.g., for total current provided to the ASIC).

From 506, the method 500 may proceed to 508 and/or 510 in response to determining that the current demand exceeds the amount of current that the PMIC is capable of providing.

At 508, the CPU is throttled to reduce the current demand. Throttling the CPU may comprise reducing an operating frequency of the CPU, reducing an operating voltage of the CPU, or idling a core of the CPU if the CPU includes multiple processor cores. In some cases, a digital control signal (e.g., serial data or binary control lines) or analog control signal is transmitted to the CPU effective to cause the CPU to throttle. For example, a current manager of the PMIC may scale an operating frequency and operating voltage of the CPU by 5% to reduce the amount of current drawn by the CPU to operate.

At 510, the GPU is throttled to reduce the current demand. Throttling the GPU may comprise reducing an operating frequency of the GPU, reducing an operating voltage of the GPU, or idling a core of the GPU if the GPU includes multiple processor cores. In some cases, a digital control signal or analog control signal is transmitted to the GPU effective to cause the GPU to throttle. Alternately or additionally, the CPU and GPU may be throttled concurrently to reduce the aggregate current demand. By so doing, the performance impact of throttling can be distributed to more than one component to minimize effects the throttling may have on user experience.

At 512, it is determined whether the reduced current demand exceeds the amount of current that the PMIC is capable of providing. This may include receiving and combining updated indications of the current consumed by the CPU and CPU of the ASIC. The method 500 may return to 508 or 510 to further throttle the CPU or GPU of the ASIC. By so doing, the CPU and/or GPU of the ASIC can be iteratively throttled until the current demand of the ASIC no longer exceeds the amount of current that the PMIC can provide the ASIC.

Figure 6:
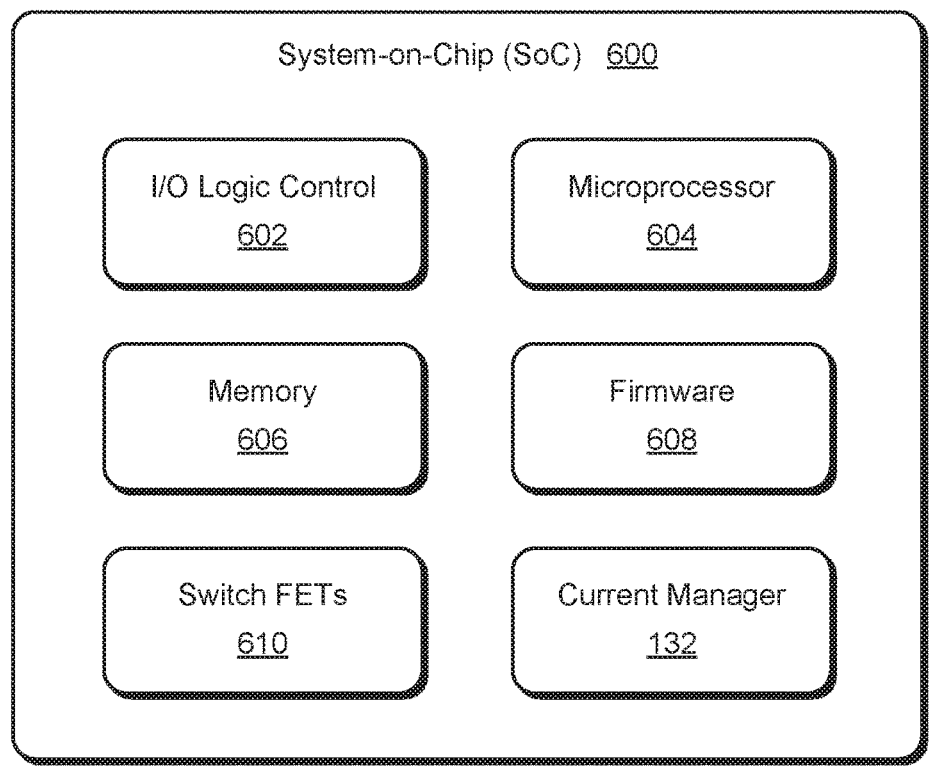
FIG. 6 illustrates an example System-on-Chip (SoC) environment for implementing aspects of managing aggregate IC current demand.

FIG. 6 illustrates a exemplary System-on-Chip (SoC) 600 that can implement various aspects for managing aggregate IC current demand. The SoC 600 can be implemented in any suitable apparatus, such as a smart-phone, a cellular phone, a netbook, a tablet computer, a server, a wireless router, network-attached storage, a camera, a set-top box, or any other type of apparatus that may be implemented with an ASIC.

The SoC 600 can be integrated with electronic circuitry, a microprocessor, memory, input-output (I/O) logic control, analog-to-digital circuits, communication interfaces and components, other hardware, firmware, and/or software useful to provide power management for a device, such as any of the above-listed apparatuses. The SoC 600 can also include an integrated data bus (not shown) that couples the various components of the SoC for data communication between the components. In some cases, these various components may be configured to implement concepts described herein via internal components (e.g., transistors), external components (e.g., inductors, resistors, or capacitors), or any suitable combination thereof.

In this example, the SoC 600 includes various components such as input-output (I/O) logic control 602 (e.g., analog-to-digital or digital-to-analog logic) and a microprocessor 604 (e.g., any of a microcontroller, application processor, DSP, or pulse-width modulation (PWM) controller). The SoC 600 also includes a memory 606, which can be any type of RAM, nonvolatile memory (e.g., NAND Flash), read-only memory (ROM), electronically erasable programmable ROM (EEPROM), and/or other suitable electronic data storage. The SoC 600 can also include various state machines, software, or operating systems, such as firmware 608, which can be processor-executable instructions maintained by memory 606 and executed by microprocessor 604. The SoC 600 can also include other various communication interfaces and components, other hardware, firmware, and/or software.

The SoC 600 also includes switch field-effect transistors 610 (switch FETs 610) and current manager 132, which may be embodied as disparate or combined components, as described in relation to aspects presented herein. Examples of these various components, functions, and/or entities, and their corresponding functionality, are described with reference to the respective components of the environment 100 shown in FIGS. 1 and 2. The switch FETs 610 may be implemented as metal-oxide-semiconductor field-effect transistors (MOSFETs) of a switching regulator to step down and provide power at a particular voltage. The current manager 132, either in whole or part, can be implemented as processor-executable instructions maintained by the memory 606 and executed by the microprocessor 604 to implement various aspects and/or features described herein. In some cases, the SoC 600 is implanted as a switch-mode power supply (SMPS) controller or PMIC.

The current manager 132, either independently or in combination with other entities, can be implemented with any suitable combination of components or circuitry to implement various aspects and/or features described herein. The current manager 132 may also be provided integral with other entities of SoC 600, such as integrated with the I/O logic 602 or any other signal processing or conditioning section within SoC 600. Alternately or additionally, the current manager 132 and the other components can be implemented as hardware, firmware, fixed logic circuitry, or any combination thereof that is implemented in connection with power management circuitry of the apparatus 102.

Although the subject matter has been described in language specific to structural features and/or methodological operations, it is to be understood that the subject matter defined in the appended claims is not necessarily limited to the specific features or operations described herein, including orders in which they are performed.

What is claimed is:

1. A method implemented by a power management integrated circuit (PMIC), the method comprising:
   providing, via a first power supply circuit of the PMIC, first current to a first processing component of an integrated circuit (IC) that is coupled to the PMIC, the first power supply circuit configured to provide (i) a maximum amount of the first current;
   providing, via a second power supply circuit of the PMIC, second current to a second processing component of the IC that is coupled to the PMIC, the second power supply circuit configured to provide (ii) a maximum amount of the second current;
   receiving, at the PMIC and from the IC, a first indication of a first amount of the first current consumed by the first processing component of the IC;
   receiving, at the PMIC from the IC, a second indication of a second amount of the second current consumed by a second processing component of the IC;
   determining, at the PMIC, an aggregate current demand of the first processing component and the second processing component of the IC by combining the first amount of the first current and second amount of the second current;
   determining, by the PMIC, a current threshold for the PMIC that is based on a sum of (i) the maximum amount of the first current that the first power supply circuit is configured to provide and (ii) the maximum amount of the second current that the second power supply circuit is configured to provide;
   comparing, at the PMIC, the aggregate current demand of the first processing component and the second processing component of the IC to the current threshold of the PMIC that corresponds to the sum of (i) the maximum amount of the first current that the first power supply circuit of the PMIC is configured to provide and (ii) the maximum amount of the second current that the second power supply circuit of the PMIC is configured to provide; and
   transmitting, from the PMIC and responsive to the aggregate current demand of the first processing component and the second processing component of the IC exceeding the current threshold of the PMIC, a signal to the IC effective to alter an operational characteristic of the first processing component or the second processing component to reduce the aggregate current demand of the first processing component and the second processing component of the IC.

2. The method as recited in claim 1, wherein the first processing component of the IC is a processor core and the second processing component of the IC is a graphics processing core.

3. The method as recited in claim 2, wherein altering the operational characteristic comprises one of:
reducing a frequency at which the processor core or the graphics processing core operates;
reducing a voltage at which the processor core or the graphics processing core operates; or
idling a core of the processor core or the graphics processing core.

4. The method as recited in claim 1, wherein the first processing component or the second processing component of the IC comprises a video encoder or video decoder.

5. The method as recited in claim 1, wherein the altering the operational characteristic of the first processing component or the second processing component of the IC comprises throttling the first processing component or the second processing component.

6. The method as recited in claim 1, wherein the method comprises altering respective operational characteristics of the first processing component and the second processing component of the IC.

7. The method as recited in claim 1, wherein the IC coupled to the PMIC is embodied in whole or part as an application specific IC (ASIC), an application specific standard part (ASSP), or a system-on-chip (SoC).

8. The method as recited in claim 1, wherein the current threshold of the PMIC corresponds to a current rating of the PMIC or a combination of respective current ratings of the first power supply circuit and the second power supply circuit.

9. An apparatus comprising:
a first power supply circuit configured to provide first current, the first power supply circuit capable of providing (i) a maximum amount of the first current;
a second power supply circuit configured to provide second current, the second power supply circuit capable of providing (ii) a maximum amount of the second current;
a first output through which the first current is provided from the apparatus to a first processing component of an integrated circuit (IC) that is coupled to the apparatus;
a second output through which the second current is provided from the apparatus to a second processing component of the IC that is coupled to the apparatus;
a first input to receive, from the IC, a first indication of a first amount of the first current consumed by the first processing component of the IC;
a second input to receive, from the IC, a second indication of a second amount of the second current consumed by the second processing component of the IC;
a third output to transmit control signals from the apparatus to the IC; and
a current manager configured to:
receive, via the first input, the first indication of the first amount of the first current consumed by the IC;
receive, via the second input, the second indication of the second amount of the second current consumed by the IC;
determine an aggregate current demand for the first processing component of the IC and the second processing component of the IC by combining the first amount of the first current and the second amount of the second current consumed by the respective processing components of the IC;
determine a current threshold for the apparatus that is based on a sum of (i) the maximum amount of the first current that the first power supply circuit is capable of providing and (ii) the maximum amount of the second current that the second power supply circuit is capable of providing;
compare the aggregate current demand of the first processing component and the second processing component of the IC to the current threshold of the apparatus that corresponds to the sum of (i) the maximum amount of the first current that the first power supply circuit of the apparatus is capable of providing and (ii) the maximum amount of the second current that the second power supply circuit of the apparatus is capable of providing; and
transmit, via the third output and responsive to the aggregate current demand of the first processing component and the second processing component of the IC exceeding the current threshold of the apparatus, a control signal to the IC that is effective to alter operation of the first processing component or the second processing component of the IC to reduce the aggregate current demand of the first processing component and the second processing component of the IC that is coupled to the apparatus.

10. The apparatus as recited in claim 9, wherein:
the control signal is a first control signal;
the apparatus further comprises a fourth output to transmit other control signals to the IC; and
the current manager is further configured to transmit, via the fourth output, a second control signal to the IC such that transmission of the first control signal and second control signal is effective to alter operation of both the first processing component and the second processing component of the IC to reduce the aggregate current demand of the first processing component and the second processing component of the IC.

11. The apparatus as recited in claim 9, wherein the first amount of the first current is consumed by a processor core of the IC and the second amount of the second current is consumed by a graphics processing unit (GPU) of the IC.

12. The apparatus as recited in claim 11, wherein transmitting the control signal alters an operational characteristic of the processor core or the GPU of the IC.

13. The apparatus as recited in claim 12, wherein altering the operational characteristic comprises one of:
reducing a frequency at which the processor core or the GPU of the IC operates;
reducing a voltage at which the processor core or the GPU of the IC operates; or
idling the processor core of the IC.

14. The apparatus as recited in claim 12, wherein altering the operational characteristic comprises two of:
reducing a frequency at which the processor core or the GPU of the IC operates;
reducing a voltage at which the processor core or the GPU of the IC operates; or
idling the processor core of the IC.

15. The apparatus as recited in claim 9, wherein the control signal transmitted via the third output of the apparatus is an analog control signal or digital control signal that indicates a degree by which to alter the operation of the first processing component or the second processing component of the IC.

16. The apparatus as recited in claim 9, wherein the apparatus is implemented in whole or part as a power management IC (PMIC) that provides the first current to the first processing component of the IC and the second current to the second processing component of the IC.

17. The apparatus as recited in claim 16, wherein:
the first power supply circuit of the PMIC comprises a first switch-mode power circuit configured to provide the first current;
the second power supply circuit of the PMIC comprises a second switch-mode power circuit configured to provide the second current; and
the current threshold of the PMIC corresponds to a power rating of the PMIC that is based on the respective current that the first switch-mode power circuit and the second switch-mode power circuit are configured to provide.

18. The apparatus as recited in claim 9, wherein the IC having the first processing component and the second processing component is embodied in whole or part as an application specific IC (ASIC), an application specific standard part (ASSP), or a system-on-chip (SoC).

19. A System-on-Chip (SoC) comprising:
a first pair of metal-oxide-semiconductor field-effect transistors (MOSFETs) configured to provide first current to an integrated circuit (IC) operably coupled to the SoC, the SoC configured to provide (i) a maximum amount of the first current via the first pair of MOSFETs;
a first power output node by which the first current is provided to a first processing component of the IC;
a second pair of MOSFETSs configured to provide second current to the IC operably coupled to the SoC, the SoC configured to provide (ii) a maximum amount of the second current via the second pair of MOSFETs;
a second power output node by which the second current is provided to a second processing component of the IC;
input/output (I/O) logic configured to receive, from the IC, respective indications of a first amount of the first current consumed by the first processing component of the IC and a second amount of the second current consumed by the second processing component of the IC;
a microprocessor configured to execute instructions; and
a memory storing processor-executable instructions that, responsive to execution by the microprocessor, implement a current manager configured to:
receive, via the I/O logic, the respective indications of the first amount of the first current and the second amount of the second current consumed by the first processing component and the second processing component of the IC;
combine the first amount of the first current and the second amount of the second to determine aggregate current demand for the first processing component and the second processing component of the IC;
determine a current threshold for the SoC that is based on a sum of (i) the maximum amount of the first current that the SoC is configured to provide via the first pair of MOSFETs and (ii) the maximum amount of the second current that the SOC is configured to provide via the second pair of MOSFETs;
compare the aggregate current demand of the first processing component and the second processing component of the IC to the current threshold of the SoC that corresponds to the sum of (i) the maximum amount of the first current that the SoC is configured to provide via the first pair of MOSFETs and (ii) the maximum amount of the second current that the SOC is configured to provide via the second pair of MOSFETs; and
transmit, to the IC via the I/O logic and responsive to the aggregate current demand of the first processing component and the second processing component exceeding the current threshold of the SoC, a signal effective to alter operation of the first processing component and the second processing component to reduce the aggregate current demand of the first processing component and the second processing component of the IC.

20. The System-on-Chip as recited in claim 19, wherein the first processing component of the IC that consumes the first current is a processor core of the IC and the second processing component of the IC that consumes the second current is a graphics processing unit (GPU) of the IC.

* * * * *